United States Patent
Ochi

(10) Patent No.: US 9,614,946 B2
(45) Date of Patent: Apr. 4, 2017

(54) METHOD OF MATCHING OPERATIONS BETWEEN VEHICULAR APPARATUS AND PORTABLE TERMINAL, VEHICLE SYSTEM INCLUDING VEHICULAR APPARATUS AND PORTABLE TERMINAL, PORTABLE TERMINAL, AND INFORMATION CENTER

(71) Applicant: DENSO CORPORATION, Kariya, Aichi-pref. (JP)

(72) Inventor: Hikaru Ochi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/648,475

(22) PCT Filed: Nov. 18, 2013

(86) PCT No.: PCT/JP2013/006747
§ 371 (c)(1),
(2) Date: May 29, 2015

(87) PCT Pub. No.: WO2014/111991
PCT Pub. Date: Jul. 24, 2014

(65) Prior Publication Data
US 2015/0304472 A1    Oct. 22, 2015

(30) Foreign Application Priority Data
Jan. 18, 2013  (JP) ................................. 2013-007122

(51) Int. Cl.
*H04M 1/00* (2006.01)
*H04M 1/60* (2006.01)
*H04W 4/00* (2009.01)

(52) U.S. Cl.
CPC .......... *H04M 1/6075* (2013.01); *H04W 4/00* (2013.01)

(58) Field of Classification Search
CPC .................................................. H04M 1/6075
(Continued)

(56) References Cited

U.S. PATENT DOCUMENTS

2003/0156097 A1    8/2003  Kakihara et al.
2006/0019720 A1*   1/2006  Kakehi .................... 455/569.2
(Continued)

FOREIGN PATENT DOCUMENTS

JP    2005-032158 A    2/2005
JP    2007-074409 A    3/2007
(Continued)

OTHER PUBLICATIONS

International Search Report and Written Opinion of the International Searching Authority mailed Feb. 10, 2014 for the corresponding international application No. PCT/JP2013/006747 (and English translation).

*Primary Examiner* — Santiago Garcia
(74) *Attorney, Agent, or Firm* — Posz Law Group, PLC

(57) ABSTRACT

A portable terminal accesses an information center by using an address acquired from vehicular apparatus, requests for transmission of dedicated application operable in OS of the portable terminal, and receives the application from the information center. The dedicated application executed by the portable terminal permits the portable terminal to (i) transmit specific information specifying model of the portable terminal to the information center, (ii) receive, in response, data for matching operations between the vehicular apparatus and the portable terminal, (iii) transmit the received data to the vehicular apparatus, and (iv) receive, in response, an instruction transmitted by the vehicular apparatus, the instruction implementing a function of the portable terminal.

7 Claims, 2 Drawing Sheets

(58) Field of Classification Search
USPC .................................................. 455/569.2
See application file for complete search history.

(56) References Cited

U.S. PATENT DOCUMENTS

| | | |
|---|---|---|
| 2006/0276186 A1* | 12/2006 | Hamamura et al. .......... 455/420 |
| 2010/0127996 A1* | 5/2010 | Kitahara et al. .............. 345/173 |
| 2010/0220857 A1* | 9/2010 | Kawamura et al. ............ 380/44 |
| 2011/0258267 A1* | 10/2011 | Tozaki et al. ................. 709/206 |
| 2011/0306338 A1* | 12/2011 | Ozaki et al. .................. 455/423 |
| 2012/0095642 A1* | 4/2012 | Nishida ........................ 701/31.4 |
| 2012/0198035 A1 | 8/2012 | Matsuura et al. |
| 2013/0035117 A1* | 2/2013 | Litkouhi et al. ........... 455/456.4 |
| 2013/0137476 A1* | 5/2013 | Kawaguchi et al. ......... 455/519 |
| 2014/0330453 A1* | 11/2014 | Nakagawa ........................ 701/2 |
| 2014/0337546 A1* | 11/2014 | Kitahama et al. .............. 710/73 |
| 2015/0371472 A1* | 12/2015 | Kamiya .......................... 710/73 |

FOREIGN PATENT DOCUMENTS

| | | |
|---|---|---|
| JP | 2009-025254 A | 2/2009 |
| JP | 2010-154203 A | 7/2010 |
| JP | 2010-250376 A | 11/2010 |
| JP | 2012-060396 A | 3/2012 |

\* cited by examiner

METHOD OF MATCHING OPERATIONS BETWEEN VEHICULAR APPARATUS AND PORTABLE TERMINAL, VEHICLE SYSTEM INCLUDING VEHICULAR APPARATUS AND PORTABLE TERMINAL, PORTABLE TERMINAL, AND INFORMATION CENTER

CROSS REFERENCE TO RELATED APPLICATIONS

The present disclosure is a U.S. national stage application of International Patent Application No. PCT/JP2013/006747 filed on Nov. 18, 2013 and is based on Japanese Patent Application No. 2013-7122 filed on Jan. 18, 2013, the disclosures of which are incorporated herein by reference.

TECHNICAL FIELD

The present disclosure relates to a method of matching operations between a vehicular apparatus and a portable terminal in a vehicle system carrying out a function of the portable terminal by an instruction from the vehicular apparatus, a vehicle system including a vehicular apparatus and a portable terminal, a portable terminal, and an information center corresponding to a vehicular apparatus.

BACKGROUND

A vehicular apparatus mounted in a vehicle carries out a function of a portable terminal connected to the vehicular apparatus by transmitting a command to the portable terminal. There are many models and OSs (Operating Systems) of portable terminals connected to such a vehicular apparatus. Consequently, even when a vehicular apparatus transmits a standardized command to carry out a predetermined function of a portable terminal, the predetermined function is not carried out depending on the model and OS of the portable terminal, and an inconvenience may occur.

In patent literature 1, a hands-free apparatus as a kind of the vehicular apparatus transmits a command for inquiring a model name to a portable terminal connected to the hands-free apparatus and acquires the model name of the portable terminal. When an inconvenience depending on the model name of the portable terminal exists, the hands-free apparatus performs a process of correcting the inconvenience.

PATENT LITERATURE

Patent Literature 1: JP 2007-74409 A

SUMMARY

In patent literature 1, the hands-free apparatus transmits a command for inquiring a model name to a portable terminal. However, the command for inquiring a model number is not usually included in a standardized command. Consequently, a portable terminal does not always reply the model name in response to the inquiry, and the hands-free apparatus may not acquire the model name of the portable terminal. In addition, the hands-free apparatus recognizes only the model name of the portable terminal; thus, if an inconvenience caused by the difference in OSs occurs, the inconvenience may not be corrected.

In consideration of the above, an object of the present disclosure is to provide a matching method capable of matching operations between a vehicular apparatus and a portable terminal regardless of model name and OS of the portable terminal, a vehicle system including a vehicular apparatus and a portable terminal, a portable terminal, and an information center.

To achieve the object, according to a first example of the present disclosure, a method of matching operations between a vehicular apparatus and a portable terminal is provided in a vehicle system, which includes the vehicular apparatus and the portable terminal and implements a function of the portable terminal by an instruction from the vehicular apparatus. The method includes the followings: acquiring, by the portable terminal, an address of an information center corresponding to the vehicular apparatus from the vehicular apparatus; accessing, by the portable terminal, the information center by using the acquired address to make a request for transmission of an application that is operable in an OS of the portable terminal; transmitting, by the information center, the application to the portable terminal in response to the request of transmission made by the portable terminal; transmitting, by the portable terminal, specific information to the information center by executing the application received from the information center to acquire the specific information from the portable terminal, the specific information permitting model of the portable terminal to be specified; transmitting, by the information center, data of matching operations between the vehicular apparatus and the portable terminal to the portable terminal, based on the specific information received from the portable terminal; transmitting, by the portable terminal, the data that is received from the information center to the vehicular apparatus by executing the application; and transmitting, by the vehicular apparatus, the instruction to the portable terminal based on the data that is received from the portable terminal.

According to the first example, a portable terminal acquires an address of an information center corresponding to a vehicular apparatus, from the vehicular apparatus, and accesses the information center by using the acquired address. The portable terminal requests the information center to transmit an application which can operate in an OS of the portable terminal. The information center transmits the application requested by the portable terminal to the portable terminal. The portable terminal executes the application received from the information center to acquire specific information by which model of the terminal itself can be specified from the portable terminal, and transmits the specific information to the information center. Therefore, the information center can acquire the information of the model and OS of the portable terminal without fail.

On the basis of the model information of the portable terminal received, the information center transmits data for matching operations between the vehicular apparatus and the portable terminal to the portable terminal. By executing the application received from the information center, the portable terminal transmits the data received from the information center to the vehicular apparatus. Therefore, the vehicular apparatus can acquire the data for matching the operations between the vehicular apparatus and the portable terminal in accordance with the model and OS of the portable terminal, from the information center via the portable terminal.

The vehicular apparatus transmits an instruction to carry out a function of the portable terminal, to the portable terminal on the basis of the data received from the portable terminal. Therefore, regardless of the model and OS of the portable terminal, the operations between the vehicular apparatus and the portable terminal can be matched.

According to a second example of the present disclosure, a vehicle system including a vehicular apparatus mounted to a vehicle and a portable terminal is provided to implement a function of the portable terminal by an instruction from the vehicular apparatus. The portable terminal includes the followings: an acquisition device that acquires an address of an information center corresponding to the vehicular apparatus, from the vehicular apparatus; a request device that accesses the information center by using the acquired address to make a request of transmission of an application that is operable in an OS of the portable terminal; an application reception device that receives the application transmitted by the information center in response to the request of transmission; an information transmission device that transmits specific information to the information center by executing the application received from the information center to acquire the specific information from the portable terminal, the specific information permitting model of the portable terminal to be specified; a data reception device that receives data of matching operations between the vehicular apparatus and the portable terminal, the data being transmitted by the information center based on the specific information; and a data transmission device that transmits the data that is received from the information center, to the vehicular apparatus by executing the application. The vehicular apparatus includes an instruction transmission device that transmits the instruction to the portable terminal based on the data that is received from the portable terminal.

According to the second example, in a manner similar to the above first example, regardless of the model and OS of a portable terminal, the operations between a vehicular apparatus and a portable terminal can be matched.

According to a third example of the present disclosure, a portable terminal including an own function that is implemented by an instruction from a vehicular apparatus mounted to a vehicle. The portable terminal includes the followings: an acquisition device that acquires an address of an information center corresponding to the vehicular apparatus, from the vehicular apparatus; a request device that accesses the information center by using the acquired address to make a request of transmission of an application that is operable in an OS of the portable terminal; an application reception device that receives the application transmitted by the information center in response to the request of transmission; an information transmission device that transmits specific information to the information center by executing the application received from the information center to acquire the specific information from the portable terminal, the specific information permitting model of the portable terminal to be specified; a data reception device that receives data of matching operations between the vehicular apparatus and the portable terminal, the data being transmitted by the information center based on the specific information; a data transmission device that transmits the data that is received from the information center, to the vehicular apparatus by executing the application; and a control device that implements an own function by the instruction transmitted from the vehicular apparatus based on the data.

According to the third example, in a manner similar to the above first example, regardless of the model and OS of the terminal itself, the operations between a vehicular apparatus and the terminal itself can be matched.

According to a fourth example of the present disclosure, an information center is provided to correspond to a vehicular apparatus that transmits an instruction to a portable terminal to implement a function of the portable terminal. The information center includes a storage device, an application transmission device, and a data transmission device. The storage device stores a data and an application. The data is of matching operations between the vehicular apparatus and the portable terminal, and is set based on specific information permitting model of the portable terminal to be specified. The application is operable in an OS of the portable terminal. The application being executed by the portable terminal causes the portable terminal to acquire the specific information from the portable terminal and transmit the acquired specific information to the information center, and transmit the data received from the information center to the vehicular apparatus. The application transmission device transmits the application to the portable terminal in response to a request made by the portable terminal. The data transmission device transmits the data to the portable terminal, based on the specific information transmitted by the portable terminal having executed the application.

According to the fourth example, by executing an application received from an information center by a portable terminal, the information center acquires model information of the portable terminal. On the basis of the model information of the portable terminal acquired, the information center transmits data for matching operations between the vehicular apparatus and the portable terminal to the portable terminal. By executing the application by the portable terminal, the portable terminal transmits the data received from the information center to the vehicular apparatus. Therefore, regardless of the model and OS of the portable terminal, the operations between the vehicular apparatus and the portable terminal corresponding to the information center can be matched.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
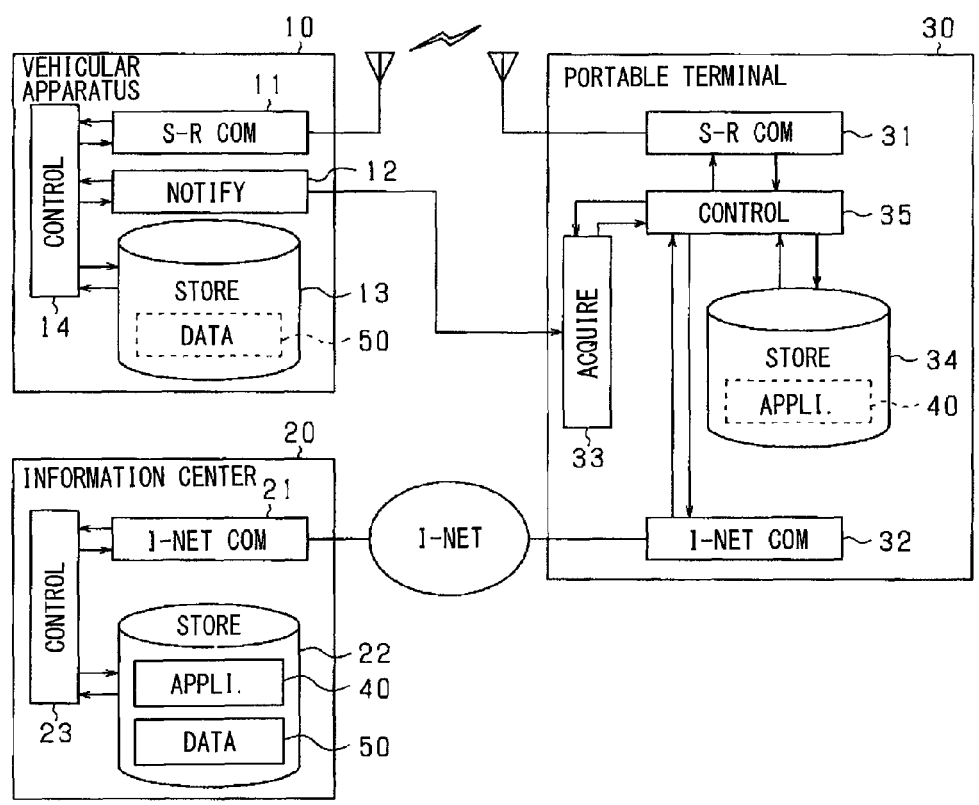
FIG. 1 is a block diagram illustrating a configuration of a vehicular system and an information center, according to an embodiment of the present disclosure.

The following will describe a configuration of a vehicular system applying a method of matching operations of a vehicular apparatus mounted on a vehicle and a portable terminal, with reference to the drawings. A vehicular system according to an embodiment includes, as in FIG. 1, a vehicular apparatus 10 and a portable terminal 30. The functions of the portable terminal 30 such as audio, hands-free telephone, and mail are implemented by an instruction from the vehicular apparatus 10. The portable terminal 30 can communicate with information center 20 via the Internet (I-NET).

The information center 20 is an information center corresponding to the vehicular apparatus 10 and includes internet communication unit (I-NET COM) 21, storage 22 (storage device), and controller 23. The internet communication unit (I-NET COM) 21, the storage 22, and the controller 23 are included in each of an application transmission device and a data transmission device.

The internet communication unit 21 enables connection to the Internet by using a communication method such as Wi-Fi (registered trademark).

The storage 22 is a storage device or storage region such as a hard disk unit. The storage 22 stores dedicated applications 40 which can operate in the OSs of the portable terminals 30. The storage 22 also stores data 50 for matching operations of the vehicular apparatus 10 and the portable terminal 30 for each of models and OSs of the portable terminals 30. The data 50 is a data table stipulating a communication procedure including order, timings, and instructions to be transmitted between the vehicular apparatus 10 and the portable terminal 30. The communication procedure is set according to the state of the portable terminal 30 and the functions of the portable terminal 30 to be realized. The state of the portable terminal 30 includes an execution state of an application, which is other than the dedicated application 40 and executed by the portable terminal 30, and a state of connection to an apparatus other than the vehicular apparatus 10.

The controller 23 is a microcomputer including CPU, RAM, ROM, I/O, and bus line connecting those components. When a request of transmitting the dedicated application 40 is received from the portable terminal 30 via the internet communication unit 21, the controller 23 acquires the dedicated application 40 which can operate by the OS of the portable terminal 30, from the storage 22. The controller 23 transmits the dedicated application 40 acquired from the storage 22 to the portable terminal 30 via the internet communication unit 21. When specific information by which the model of the portable terminal 30 can be specified is received from the portable terminal 30 via the internet communication unit 21, the controller 23 acquires the data 50 for matching the operations of the vehicular apparatus 10 and the portable terminal 30 from the storage 22 on the basis of the received specific information. The controller 23 transmits the data 50 obtained from the storage 22 to the portable terminal 30 via the internet communication unit 21.

The portable terminal 30 may be a smartphone, a cellular phone, or a tablet terminal and includes a short-range communication unit 31, an internet communication unit 32, an information acquiring unit 33 (acquisition device), a storage 34, and a controller 35 (control device). The internet communication unit 32 and the controller 35 are included in each of a request device, an information transmission device, and a data reception device. The internet communication unit 32, the storage 34, and the controller 35 are included in an application reception device. The short-range communication unit (S-R COM) 31 and the controller 35 are included in a data transmission device.

The short-range communication unit 31 enables wireless connection to the vehicular apparatus 10 by using a communication method such as Bluetooth (registered trademark) or WiFi. The internet communication unit 32 enables connection to the Internet by using a communication method such as Wi-Fi, LTE (Long Term Evolution), or 3G.

The information acquiring unit 33 acquires the address of the information center 20 from the vehicular apparatus 10 by a method which does not depend on the model or OS of the portable terminal 30. Concretely, the information acquiring unit 33 includes a camera capable of reading a QR code (registered trademark), a communication unit of the NFC (Near Field Communication) standard, or an infrared communication unit. The information acquiring unit 33 reads an address formed as a QR code and performs a communication conformed to the NFC standard or infrared communication, thereby obtaining the address of the information center 20 from the vehicular apparatus 10.

The storage 34 is a storage device or storage region such as a flash memory. In the storage 34, the dedicated application 40 received from the information center 20 via the internet communication unit 32 is stored.

The controller 35 is a microcomputer including CPU, RAM, ROM, I/O, and bus line connecting those components. By executing the dedicated application 40, the controller 35 obtains specific information, which can specify the model of the portable terminal 30, from the portable terminal 30 and transmits the obtained specific information to the information center 20 via the internet communication unit 32. The specific information includes at least one of the model name of the portable terminal 30 and the model number assigned to the portable terminal 30 by the manufacturer.

By executing the dedicated application 40, the controller 35 sets connection between the short-range communication unit 31 and a short-range communication unit 11 of the vehicular apparatus 10 which will be described later, and transmits the data 50, which is received from the information center 20 via the internet communication unit 32, to the vehicular apparatus 10 via the short-range communication unit 31. Further, by executing the dedicated application 40, the controller 35 obtains the state of the portable terminal 30 and transmits the obtained state to the vehicular apparatus 10 via the short-range communication unit 31. That is, by being executed by the controller 35, the dedicated application 40 realizes three functions; the function of transmitting specific information to the information center 30, the function of transmitting the data 50 to the vehicular apparatus 10, and the function of transmitting the state of the portable terminal 30 to the vehicular apparatus 10.

The vehicular apparatus 10 includes the short-range communication unit (S-R COM) 11, an information notifying unit 12, a storage 13, and a controller 14. The short-range communication unit 11, the storage 13, and the controller 14 are included in an instruction transmission device.

The short-range communication unit 11 enables wireless connection to the portable terminal 30 by using a communication method such as Bluetooth or WiFi. The information notifying unit 12 notifies the portable terminal 30 of the address of the information center 20. Concretely, the information notifying unit 12 includes a QR code expressing the address of the information center 20, a communication unit performing a communication conforming to the NFC standard, or a communication unit performing an infrared communication.

The storage 13 is a storage device or storage region such as a hard disk unit or a DVD unit. The storage 13 stores the data 50 received from the portable terminal 30 via the short-range communication unit 11.

The controller 14 is a microcomputer including CPU, RAM, ROM, I/O, and bus line connecting those components. The controller 14 transmits an instruction to the portable terminal 30 to realize a function of the portable terminal 30 on the basis of the data 50 stored in the storage 13 and the state of the portable terminal 30 received from the portable terminal 30.

Figure 2:
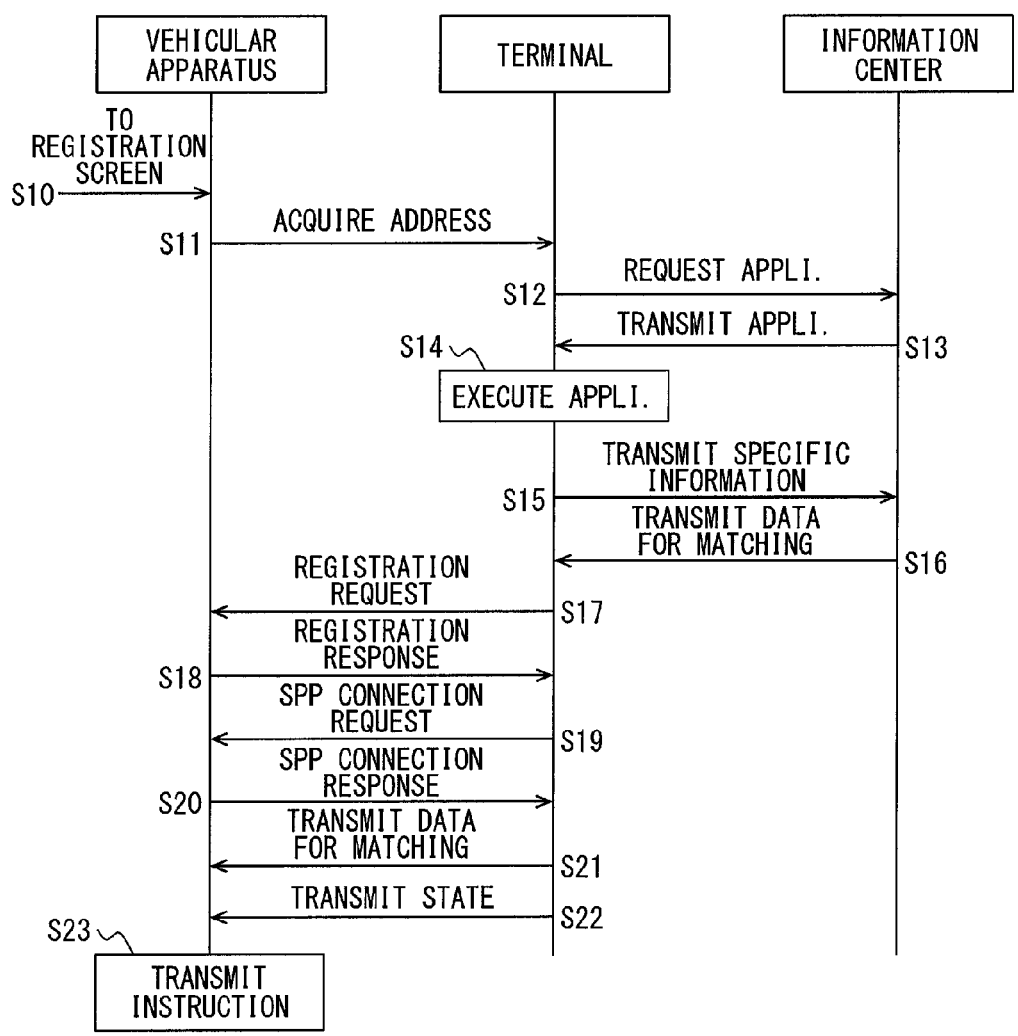
FIG. 2 is a sequence diagram illustrating procedure of matching operations of a vehicular apparatus and a portable terminal.

Next, referring to FIG. 2, a procedure will be described which permits the vehicle system of the embodiment to match the operations of the vehicular apparatus 10 and the portable terminal 30, which are connected by Bluetooth.

When the vehicular apparatus 10 uses a function of the portable terminal 30 connected by Bluetooth, the communication procedure between the vehicular apparatus 10 and the portable terminal 30 is standardized by a function used. However, depending on the model, OS, and state of the portable terminal 30, even when an instruction is transmitted from the vehicular apparatus 10 to the portable terminal 30 in accordance with the standardized procedure, an inconvenience that a desired function of the portable terminal 30 cannot be used may occur.

For example, when the vehicular apparatus 10 transmits a press command of fast-forward or rewind to the portable terminal 30 at intervals of two seconds in accordance with a procedure standardized by Bluetooth in order to perform fast-forward or rewind in the audio function of the portable terminal 30, in some cases, an inconvenience such that fast-forward or rewind and normal playback are repeated at intervals of two seconds occurs. Consequently, the vehicle system of the embodiment matches the operations of the vehicular apparatus 10 and the portable terminal 30 in accordance with the model, OS, and state of the portable terminal 30. The sequence is executed by the respective controllers 23, 14, and 33 of the information center 20, the vehicular apparatus 10, and the portable terminal 30.

It is noted that the sequence includes sections (also referred to as steps), each of which is represented, for instance, as S10. Further, each section can be divided into several sub-sections while several sections can be combined into a single section. Furthermore, each of thus configured sections can be also referred to as a device, or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

First, in S10, when the user manipulates the vehicular apparatus 10 to register the portable terminal 30 as a device permitted to perform communication conformed to Bluetooth in the vehicular apparatus 10, the screen indication of the vehicular apparatus 10 changes to a registration screen. The vehicular apparatus 10 searches for a connection object and detects the portable terminal 30.

In S11, the address of the information center 20 is transmitted from the vehicular apparatus 10 to the portable terminal 30 by communication conformed to the NFC standard or infrared communication, and the portable terminal 30 obtains the address of the information center 20. Alternatively, the user manipulates the portable terminal 30 and reads the QR code of the information notifying unit 12, so that the portable terminal 30 obtains the address of the information center 20.

In S12, the portable terminal 30 accesses the information center 20 by using the obtained address and, according to manipulation of the user, requests the information center 20 to transmit the dedicated application 40 which can operate in the OS of the portable terminal 30. The user designates the OS of the portable terminal 30.

In S13, the information center 20 transmits the dedicated application 40 according to the OS of the portable terminal 30 to the portable terminal 30 in accordance with the transmission request of the dedicated application 40 by the portable terminal 30.

In S14, the portable terminal 30 installs and executes the dedicated application 40 received from the information center 20. The processes in S15, S17, S19, S21, and S22 are performed when the portable terminal 30 executes the dedicated application 40.

In S15, by executing the dedicated application 40, the portable terminal 30 obtains specific information from itself and transmits the obtained specific information to the information center 20. In S16, on the basis of the specific information received from the portable terminal 30 and the OS information, the information center 20 transmits the data 50 corresponding to the model and the OS of the portable terminal 30 to the portable terminal 30.

In S17 to S21, the portable terminal 30 executes the dedicated application 40 to transmit the data 50 received from the information center 20 to the vehicular apparatus 10. First in S17 to S21, the portable terminal 30 executes the dedicated application 40 to perform settings of connection between the vehicular apparatus 10 and the portable terminal 30 in accordance with the model and OS of the portable terminal 30. In the case of connecting the vehicular apparatus 10 and the portable terminal 30 by Bluetooth or the like, in rare cases, the connection setting fails even in accordance with the standardized procedure. The portable terminal 20 thus executes the dedicated application 40 received from the information center 20, so as to perform the connection setting between the vehicular apparatus 10 and the portable terminal 30 without fail, regardless of the model and OS of the portable terminal 30.

In S17, the portable terminal 30 requests the vehicular apparatus 10 to register the portable terminal 30 itself. In S18, the vehicular apparatus 10 accepts the request of registration and performs a process of pairing the portable terminal 30. This permits the vehicular apparatus 10 and the portable terminal 30 to recognize each other as communication parties. In S19, the portable terminal 30 requests the vehicular apparatus 10 for an SPP (Serial Port Profile) connection. In S20, the vehicular apparatus 10 accepts the request of SPP connection and executes an SPP connection process with the portable terminal 30. This permits an environment of performing a stabilized Bluetooth serial communication between the vehicular apparatus 10 and the portable terminal 30 to be ready. In S21, the portable terminal 30 transmits the data 50 received from the information center 20 to the vehicular apparatus 10 by the Bluetooth serial communication.

In S22, the portable terminal 30 executes the dedicated application 40 to thereby obtain the state of the terminal itself including a state of executing an application other than the dedicated application 40, and transmits the obtained state of the terminal itself to the vehicular apparatus 10 by the Bluetooth serial communication. Depending on the state of the portable terminal 30, even when the same instruction is transmitted from the vehicular apparatus 10 to the portable terminal 30, there is a case that the operations of the vehicular apparatus 10 and the portable terminal 30 cannot be matched. The portable terminal 30 thus executes the dedicated application 40 received from the information center 20, so as to properly obtain the state of the terminal itself and transmit the obtained state of the terminal to the vehicular apparatus 10.

In S23, on the basis of the data 50 and the state of the portable terminal 30 received from the portable terminal 30, the vehicular apparatus 10 transmits an instruction to the portable terminal 30 to realize the function of the portable terminal 30. This finishes the matching process.

By executing the matching process, even in the case where an inconvenience as that in the above-described example occurs in the standardized procedure, a press command of fast-forward or rewind is transmitted only once, and fast-forward or rewind can be executed normally. In the case of, after performing the process, re-connecting the vehicular apparatus 10 and the portable terminal 30 by Bluetooth, the processes in S10 to S18 and S21 may be omitted unless the model or OS of the portable terminal 30 is changed.

The embodiment produces the following effects.

The portable terminal 30 executes the dedicated application 40 received from the information center 20 to acquire specific information from the terminal itself and transmit it to the information center 20. Consequently, the information center 20 can acquire the information of the model of the portable terminal 30 without fail.

On the basis of the received model information of the portable terminal 30 and OS information, the information center 20 transmits the data 50 to the portable terminal 30. The portable terminal 30 executes the dedicated application 40 to thereby transmit the data 50 received from the information center 20 to the vehicular apparatus 10. Consequently, the vehicular apparatus 10 can acquire the data 50 according to the model and OS of the portable terminal 30, from the information center 20 via the portable terminal 30.

By executing the dedicated application 40, the portable terminal 30 acquires the state of the terminal itself including the execution state of an application other than the dedicated application 40, and transmits the acquired state of the terminal itself to the vehicular apparatus 10. Consequently, the vehicular apparatus 10 can acquire the state of the portable terminal 30.

On the basis of the state of the portable terminal 30 and the data 50 received from the portable terminal 30, the vehicular apparatus 10 transmits an instruction of carrying out a function of the portable terminal 30, to the portable terminal 30. This permits the operations between the vehicular apparatus 10 and the portable terminal 30 to match, regardless of the model, OS, and state of the portable terminal 30.

The portable terminal 30 executes the dedicated application 40 to thereby set a connection between the vehicular apparatus 10 and the portable terminal 30 in accordance with the model and OS of the portable terminal 30. Consequently, regardless of the model and OS of the portable terminal 30, a setting of connection between the vehicular apparatus 10 and the portable terminal 30 can be performed without fail.

The portable terminal 30 acquires the address of the information center 20 from the vehicular apparatus 10 by a method which does not depend on the model and OS of the portable terminal 30 such as a QR code, communication conformed to the NFC standard, or infrared communication. Consequently, regardless of the model and OS, the portable terminal 30 accesses the information center 20 without fail. In addition, the portable terminal 30 can reliably acquires data for matching the operations between the vehicular apparatus 10 and the portable terminal 30 from the information center 20 and transmit the data to the vehicular apparatus 10.

Other Embodiments

The present disclosure is not limited to the description of the foregoing embodiment but may be changed as follows.

In S11, by directly inputting the address of the information center 20 to the portable terminal 30 by the user, the portable terminal 30 may acquire the address of the information center 20.

The data 50 may include data for setting a connection between the vehicular apparatus 10 and the portable terminal 30 and, in S17 to S21, the portable terminal 30 may set a connection between the vehicular apparatus 10 and the portable terminal 30 on the basis of the data 50. In this manner as well, regardless of the model and OS of the portable terminal 30, setting of a connection between the vehicular apparatus 10 and the portable terminal 30 can be performed without fail.

Without performing the process in S22, the vehicular apparatus 10 may transmit an instruction to the portable terminal 30 in S23 on the basis of the data 50 received from the portable terminal 30. In this manner as well, although reliability is lower than the case of executing the process in S22, the operations between the vehicular apparatus 10 and the portable terminal 30 can be matched.

In S12, the portable terminal 30 may request the information center 20 to transmit the dedicated application 40 which can operate in the OS of the terminal itself automatically, not by manipulation of the user. Concretely, a dedicated address of the information center 20 may be set according to the OS of the portable terminal 30; thereby, only accessing the dedicated address enables to request the dedicated application 40 which can operate in the OS of the portable terminal 30. In the information center 20, the dedicated application 40 according to the OS of the portable terminal 30 is set for each dedicated address. The dedicated application 40 corresponding to an accessed dedicated address is transmitted to the portable terminal 30. Further, in S10, after the vehicular apparatus 10 detects the portable terminal 30, by designating the OS of the portable terminal 30 by the user, the vehicular apparatus 10 may transmit the dedicated address in accordance with the designated OS to the portable terminal 30.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A method in a vehicle system including a vehicular apparatus mounted to a vehicle, a portable terminal, and an information center corresponding to the vehicular apparatus, the information center separating from each of the vehicular apparatus and the portable terminal, the method performing matching operations to establish a connection via a first wireless communication technique between the vehicular apparatus and the portable terminal, a function of the portable terminal being implemented by an instruction from the vehicular apparatus via the first wireless communication technique, the information center having a storage device previously storing (i) an application operable in an OS (Operating System) of the portable terminal, and (ii) a data of matching operations between the vehicular apparatus and the portable terminal, the data being to be specified based on specific information specific to a model of the portable terminal, the method comprising:

acquiring, by the portable terminal using a second wireless communication technique different from the first wireless communication technique, an address of the information center corresponding to the vehicular apparatus from the vehicular apparatus;

accessing, by the portable terminal using a third wireless communication technique different from each of the first wireless communication technique and the second wireless communication technique, the information center by using the acquired address to make a request for transmission of an application that is operable in an OS (Operating System) of the portable terminal;

transmitting, by the information center using the third wireless communication technique, the application to the portable terminal in response to the request of transmission made by the portable terminal;

transmitting, by the portable terminal using the third wireless communication technique, specific information to the information center by executing the application received from the information center to acquire the specific information from the portable terminal itself, the specific information specifying a model of the portable terminal;

transmitting, by the information center using the third wireless communication technique, data of matching operations between the vehicular apparatus and the portable terminal to the portable terminal, the data being specified based on the specific information received from the portable terminal;

transmitting, by the portable terminal using the first wireless communication technique, the data that is received from the information center, to the vehicular apparatus by executing the application;

transmitting, by the vehicular apparatus using the first wireless communication technique, an instruction that implements a function of the portable terminal to the portable terminal based on the data that is received from the portable terminal; and the second wireless communication technique is enabled to acquire the address of the information center from the vehicular apparatus, regardless of any model or any OS of the portable terminal.

2. The method according to claim 1, further comprising transmitting, by the portable terminal using the first wireless communication technique, a state of the portable terminal to the vehicular apparatus by executing the application to acquire the state of the portable terminal itself, wherein, in the transmitting of the instruction to the portable terminal, the vehicular apparatus transmits the instruction to the portable terminal based on the data and the state of the portable terminal that are received from the portable terminal.

3. The method according to claim 1, wherein, the transmitting of the data to the vehicular apparatus using the first wireless communication technique includes setting, by the portable terminal, a connection between the vehicular apparatus and the portable terminal by executing the application.

4. The method according to claim 1, wherein:

the data includes data of setting a connection between the vehicular apparatus and the portable terminal; and the transmitting of the data to the vehicular apparatus using the first wireless communication technique includes setting, by the portable terminal, the connection between the vehicular apparatus and the portable terminal based on the data.

5. The method according to claim 2, wherein the state of the portable terminal includes an execution state of a different application, which is different from the application and executed by the portable terminal.

6. The method according to claim 1, wherein in the acquiring of the address using the second wireless communication technique, the portable terminal acquires the address from the vehicular apparatus by performing any one of a reading of a QR code (registered trademark), a communication conformed to NFC (Near Field Communication) standard, and an infrared communication.

7. The method according to claim 1, wherein the specific information includes at least one of a model name of the portable terminal and a model number assigned to the portable terminal.

* * * * *